United States Patent
Szabo et al.

(10) Patent No.: US 11,808,932 B2
(45) Date of Patent: Nov. 7, 2023

(54) MICROSCOPE STAND AND MODULE AND HOUSING THEREFOR

(71) Applicant: Leica Instruments (Singapore) Pte. Ltd., Singapore (SG)

(72) Inventors: Patrick Szabo, Rebstein SG (CH); Leander Gaechter, Oberriet SG (CH)

(73) Assignee: Leica Instruments (Singapore) Pte. Ltd., Singapore (SG)

( * ) Notice: Subject to any disclaimer, the term of this patent is extended or adjusted under 35 U.S.C. 154(b) by 336 days.

(21) Appl. No.: 17/180,918

(22) Filed: Feb. 22, 2021

(65) Prior Publication Data

US 2021/0263296 A1 Aug. 26, 2021

(30) Foreign Application Priority Data

Feb. 25, 2020 (EP) ..................... 20159289

(51) Int. Cl.
*G02B 21/00* (2006.01)
*G02B 21/26* (2006.01)
*G02B 21/24* (2006.01)
*G02B 21/36* (2006.01)

(52) U.S. Cl.
CPC .......... *G02B 21/26* (2013.01); *G02B 21/008* (2013.01); *G02B 21/248* (2013.01); *G02B 21/368* (2013.01)

(58) Field of Classification Search
CPC .... G02B 21/26; G02B 21/008; G02B 21/248; G02B 21/368; G02B 21/0012; G02B 21/28; G02B 7/001; G06F 1/20; H05K 5/0217; H05K 5/0247; H05K 7/14
See application file for complete search history.

(56) References Cited

U.S. PATENT DOCUMENTS

| | | | | |
|---|---|---|---|---|
| 2005/0105172 | A1* | 5/2005 | Hasegawa | C12M 23/50 359/368 |
| 2008/0247038 | A1* | 10/2008 | Sasaki | G02B 21/0088 359/395 |
| 2014/0233098 | A1* | 8/2014 | Bresolin | G06F 1/20 359/395 |
| 2018/0143418 | A1* | 5/2018 | Kapanidis | G02B 21/04 |
| 2018/0280855 | A1* | 10/2018 | Sasaki | G01N 15/082 |
| 2019/0167377 | A1 | 6/2019 | Hirose et al. | |

FOREIGN PATENT DOCUMENTS

| | | |
|---|---|---|
| CN | 203507333 U | 4/2014 |
| CN | 107120342 A | 9/2017 |
| CN | 206470471 U | 9/2017 |
| CN | 209993235 U | 1/2020 |
| DE | 202005013938 U1 | 12/2005 |
| DE | 102005044777 A1 | 3/2007 |
| EP | 1770076 A2 | 4/2007 |
| EP | 3293560 A1 | 3/2018 |
| JP | 2015046650 A | 3/2015 |
| TW | 201210571 A | 3/2012 |
| WO | 2008019298 A2 | 2/2008 |
| WO | 2012104399 A2 | 8/2012 |

* cited by examiner

*Primary Examiner* — Mustak Choudhury
(74) *Attorney, Agent, or Firm* — Hodgson Russ LLP

(57) ABSTRACT

A module for a microscope stand comprises a control device with at least one computer hardware component being configured to control the microscope stand. The module further comprises a locating device configured to interact with another locating device formed in a housing of the microscope stand for mounting the module at a predetermined installation site within the housing.

13 Claims, 5 Drawing Sheets

MICROSCOPE STAND AND MODULE AND HOUSING THEREFOR

CROSS REFERENCE TO RELATED APPLICATIONS

This application claims priority of European patent application number 20159289.6 filed Feb. 25, 2020, the entire disclosure of which is incorporated by reference herein.

TECHNICAL FIELD

The present invention relates to a module for a microscope stand, a housing for a microscope stand, and a microscope stand comprising a module and a housing.

BACKGROUND

Conventional microscopes, in particular surgical microscopes, are technically complex systems and therefore require plenty of space. Specifically, in order to control the overall operation of the microscope, a powerful control device has to be provided. Usually, such a control device is implemented by a separate computer being equipped with a plurality of hardware components which can be used for controlling the overall operation of the microscope. Thus, according to conventional configurations, the control device is provided in form of a standalone system which is to be connected to the microscope stand for performing the required control operations.

In order to save space, it may be envisaged to integrate the control device into a housing of the microscope stand. However, the hardware components of the control device require an effective cooling to ensure proper functioning, and conventional concepts for cooling hardware components within a computer require much space impeding an integration of computer hardware modules into the housing of the microscope stand. Existing computer cooling systems are disclosed e.g. in DE 10 2005 044 777 A1 and DE 20 2005 013 938 U1.

SUMMARY

It is an object of the present invention to provide a solution for enabling a control device to be integrated into a microscope stand in a space-saving manner while being cooled effectively.

This object is achieved by the subject-matter of the independent claims. Preferred embodiments are disclosed in the dependent claims and the following description.

A module for a microscope stand is provided, comprising a control device with at least one computer hardware component being configured to control a microscope. The module further comprises a locating device configured to interact with another locating device formed in a housing of the microscope stand for mounting the module at a predetermined installation site within the housing in a guided manner.

The module forms a self-contained unit which allows for a space-saving integration of available hardware computer components. As the module is configured to be mounted in a guided manner at a predetermined installation site, it provides a user-friendly solution in terms of assembly of the microscope stand.

The computer hardware component included in the module may be provided with intrinsic cooling capacity e.g. in form of an integrated fan or a liquid cooler. In such a case, the module may utilize the intrinsic cooling capacity of the computer hardware module for implementing a new integration and cooling concept. Such a concept may be advantageously applied to surgical microscopes which otherwise require a lot of space for accommodating a control device being used for controlling the overall microscope operation.

Preferably, the module comprises a front plate which forms a part of the housing in a state in which the module is located at the predetermined installation site. Thus, a compact design of the microscope stand can be achieved.

In a preferred embodiment, the front plate comprises at least one air outlet which is advantageous in terms of compactness of the microscope stand likewise.

Preferably, the front plate comprises a front panel having user-accessible external connectors coupled to the computer hardware component. By proving the module with external connectors, a user is enabled to implement the required electrical connections to the control device accommodated within the housing of the microscope stand in a convenient manner.

The at least one computer hardware component may be selected from a group including a central processing unit, a power supply, a graphic card, a display device. These components are known to generate a lot of heat when operated so that effective cooling is all the more important.

In a preferred embodiment, the module further comprises a liquid cooler integrated with the computer hardware component. The liquid cooler may comprise a heat sink coupled to the computer hardware component. Preferably, the fan is configured to guide the air through the air inlet along the heat sink.

According to another aspect, a housing for a microscope stand is provided. The housing comprises at least one air inlet and at least one air outlet. The housing further comprises a fan being positioned at the air inlet and configured to draw air from outside through the air inlet into the interior of the housing. A predetermined installation site is provided inside the housing for receiving a control device with at least one computer hardware component. The housing further comprises an air duct configured to guide the air drawn into the interior of the housing thereby creating a cooling air flow between the at least one air inlet and the at least one air outlet passing the installation site.

The aforementioned fan may be formed by a radial fan which is particularly powerful in terms of cooling capacity.

The installation site may be configured to receive a module as described above, wherein the module includes the control device.

Preferably, the housing comprises a locating device which is configured to interact with another locating device formed on the module for guided mounting of the module at said predetermined installation site within the housing.

In a preferred embodiment, the housing comprises a display device, wherein at least a part of the display device is accommodated within the housing. The display device may be arranged to let the cooling air flow pass the aforementioned part of the display device. For instance, the display device may comprise a screen, the front thereof being exposed to the outside and the rear thereof being accommodated within the housing. Such a screen generates heat which can be dissipated by guiding the cooling air flow along the rear of the screen.

According to another aspect, a microscope stand is provided, comprising a module and a housing as described above.

The at least one computer hardware component may comprise an integrated fan configured to cool the computer hardware component. The integrated fan may be positioned to draw air from the outside through an air inlet of the housing into the interior of the housing. The proposed configuration advantageously utilizes an already available cooling function of existing computer hardware components for effectively guiding a cooling air flow from the outside into the housing and finally out of the housing. Specifically, such the computer hardware component may comprise an integrated fan which, in itself, provides effective cooling of the computer hardware component in the first place. In addition to this intrinsic cooling function dissipating the heat from the computer hardware component as such, the integrated fan at the same time provides for an air intake function by drawing the air from the outside through the air inlet into the housing. For this, the computer hardware component included in the module may be arranged within the housing such that the integrated fan is located close to the air inlet. Preferably, the integrated fan is arranged to directly face the air inlet.

In a preferred embodiment, at least one of the housing and module comprises an air deflector structure. In particular, the air deflector structure may be formed by a plurality of metal sheets appropriately arranged within the housing of the microscope stand.

BRIEF DESCRIPTION OF THE DRAWING VIEWS

Hereinafter, a specific embodiment is described referring to the drawing, wherein.

DETAILED DESCRIPTION

FIGS. 1 to 4 show a microscope stand 100 according to an embodiment. In the following, the overall configuration of the microscope stand 100 will be described referring concurrently to FIGS. 1 to 4 which show the microscope stand 100 from different perspectives with FIGS. 2 and 4 being cut-away views illustrating an interior of the microscope stand 100. Further, it is to be noted that only those features of the microscope stand 100 are described which facilitate understanding of the proposed configuration.

Figure 2:
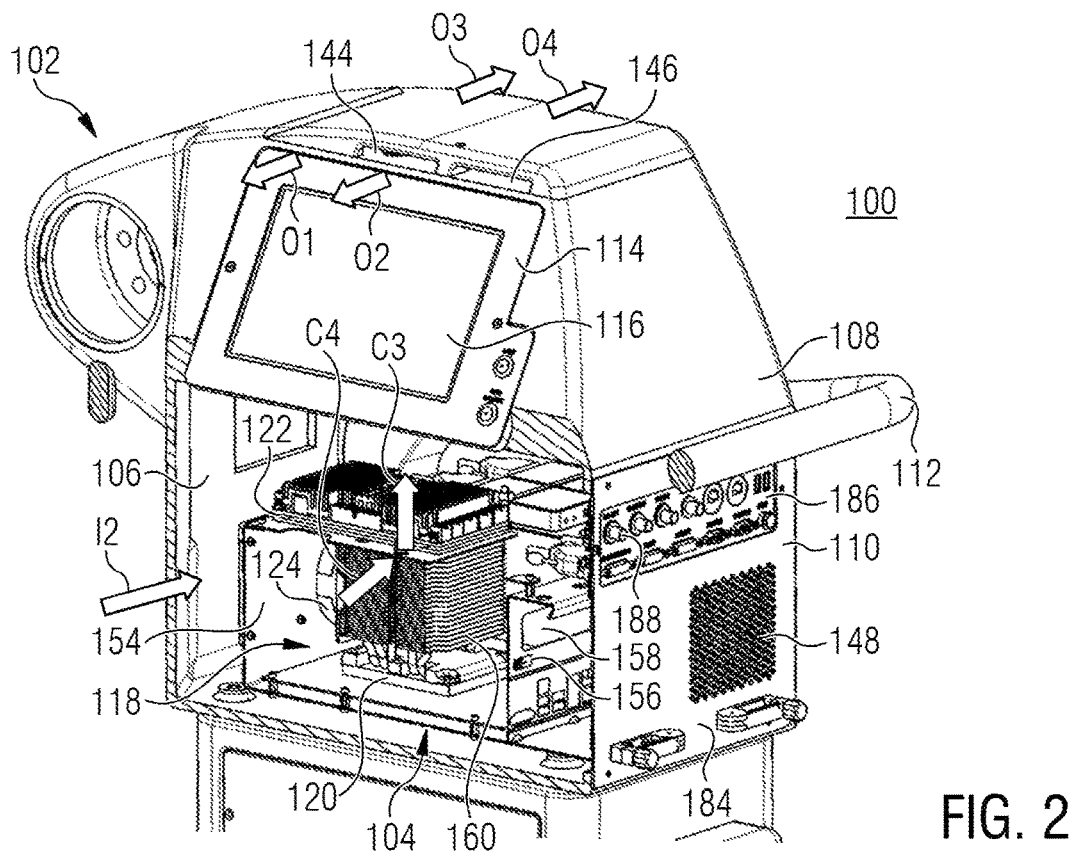
FIG. 2 is a perspective cut-away view of the microscope stand showing an interior of a housing thereof.
Figure 4:
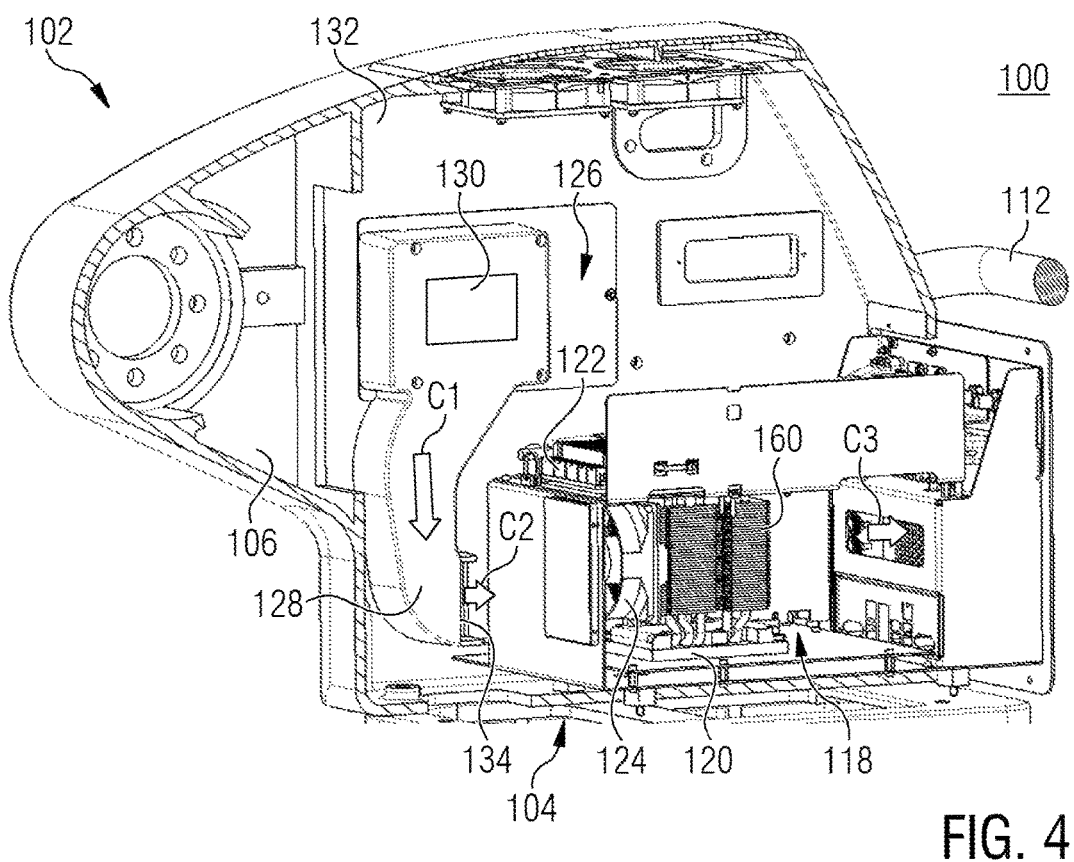
FIG. 4 is another perspective cut-away view of the microscope stand showing the interior thereof.
Figure 6:
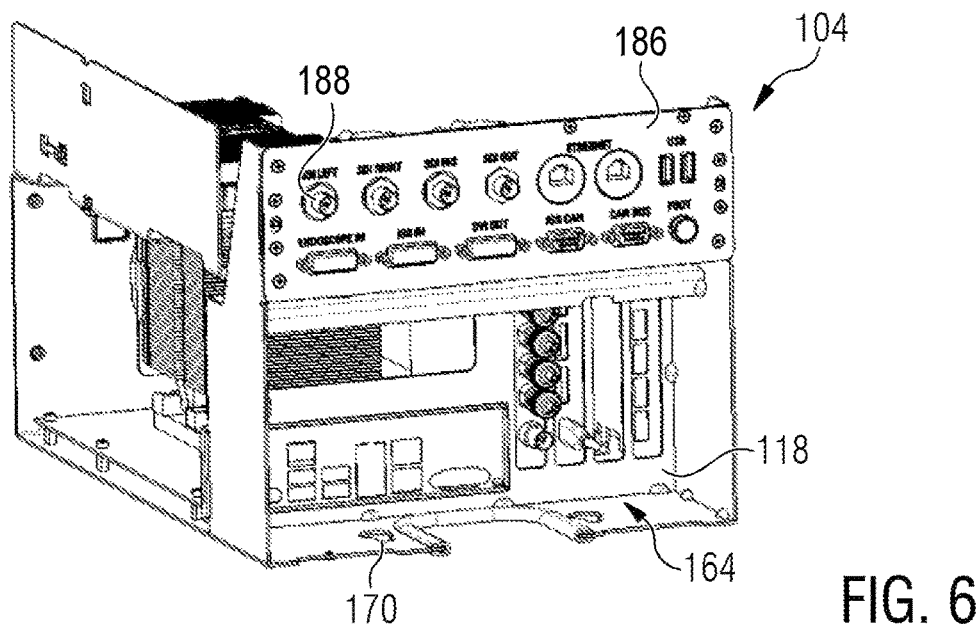
FIG. 6 is a perspective view of the module removed from the housing of the microscope stand.

The microscope stand 100 comprises a housing 102 and a module 104 which is adapted to be accommodated in an interior 106 of the housing 102 as shown in FIGS. 2 and 4. The module 104 alone is shown in FIG. 6 and will be explained below in further detail.

The housing 102 of the microscope stand 100 comprises a side surface 108, a lower part thereof being formed by a front plate 110 of the module 104 in a state in which the module 104 is properly installed within the housing 102. Further, the housing 102 may have a circumferential hand grip 112 which can be grabbed by a user for moving the microscope stand 100. Further, the housing 102 may comprise a display device 114 having a screen 116, the front thereof being exposed to the outside and the rear thereof (not shown in the Figures) being accommodated within the housing 102.

As mentioned above, the housing 102 serves to accommodate the module 104 which includes a control device commonly referred to as 118 in FIGS. 2 and 4. The control device 118 may comprise a central processing unit (CPU) 120 and a power supply 122. Additional computer hardware components being part of the control device 118 may be accommodated within the housing 102.

The CPU 120 is provided with an integrated fan 124 which is configured to dissipate heat generated by the CPU 120. The integrated fan 124 forms part of a cooling system which is commonly referred to as 126 in FIG. 4. The cooling system 126 serves to cool the control device 118 as a whole.

Figure 5:
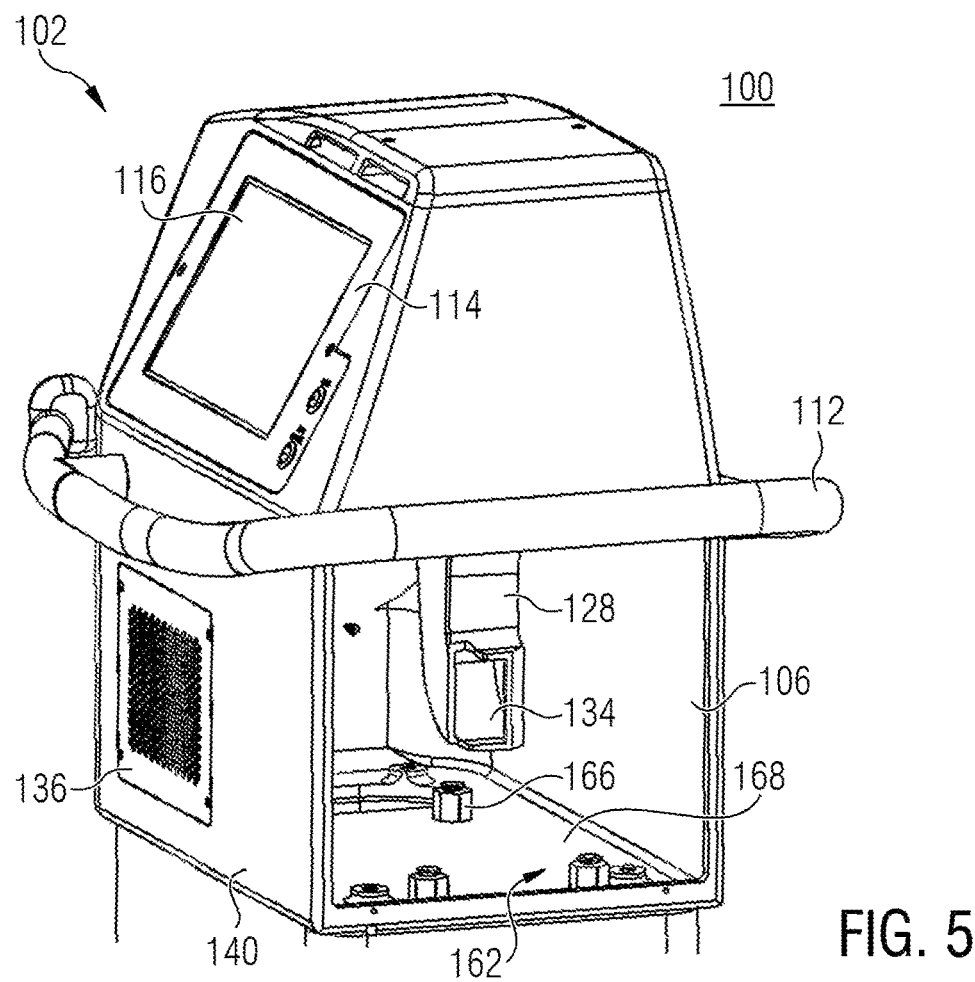
FIG. 5 is a perspective view of the microscope stand in a state where a module is removed from the housing.

In addition to the fan 124 integrated with the CPU 120, the cooling system 126 may comprise an air duct 128 enclosing a fan 130 as schematically depicted in FIG. 4. The air duct 128 may be formed by a vertically elongated channel which is mounted to an inner wall 132 of the housing 102. As can be seen in FIGS. 4 and 5, the air duct 128 has a discharge opening 134 directed towards the module 104 when the module 104 is mounted within the housing 102 at a predetermined installation site as described later.

Figure 1:
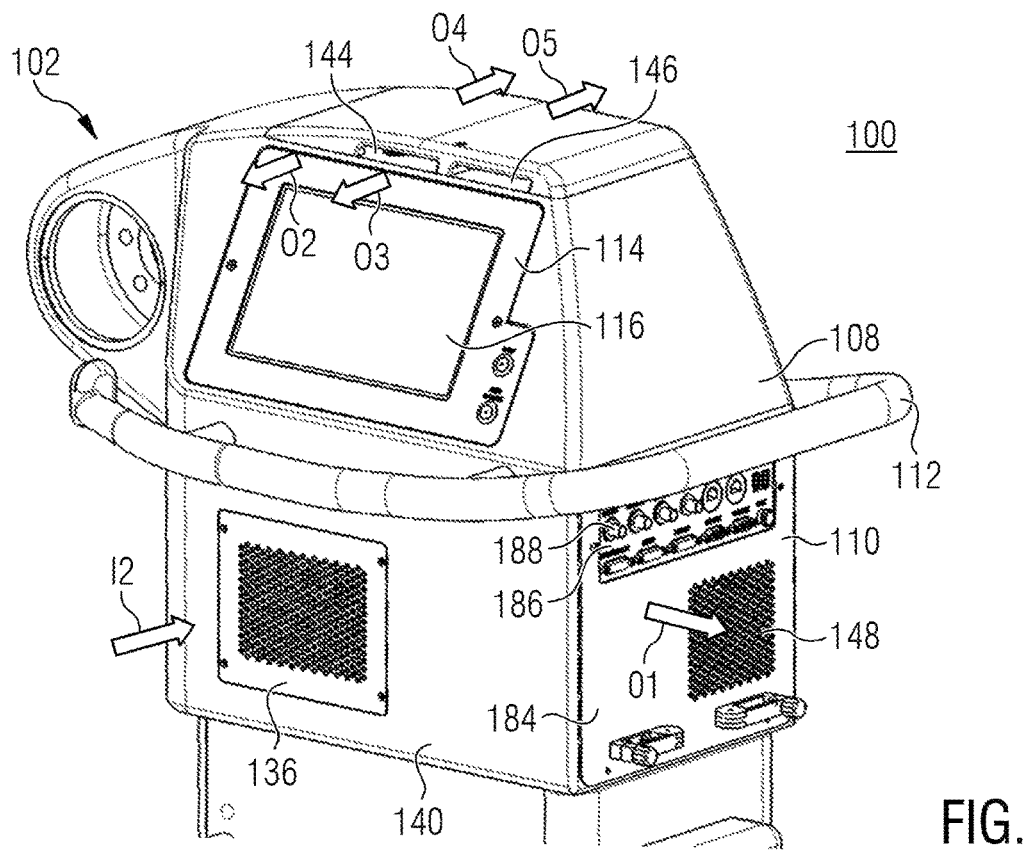
FIG. 1 is a perspective view of a microscope stand according to an embodiment.
Figure 3:
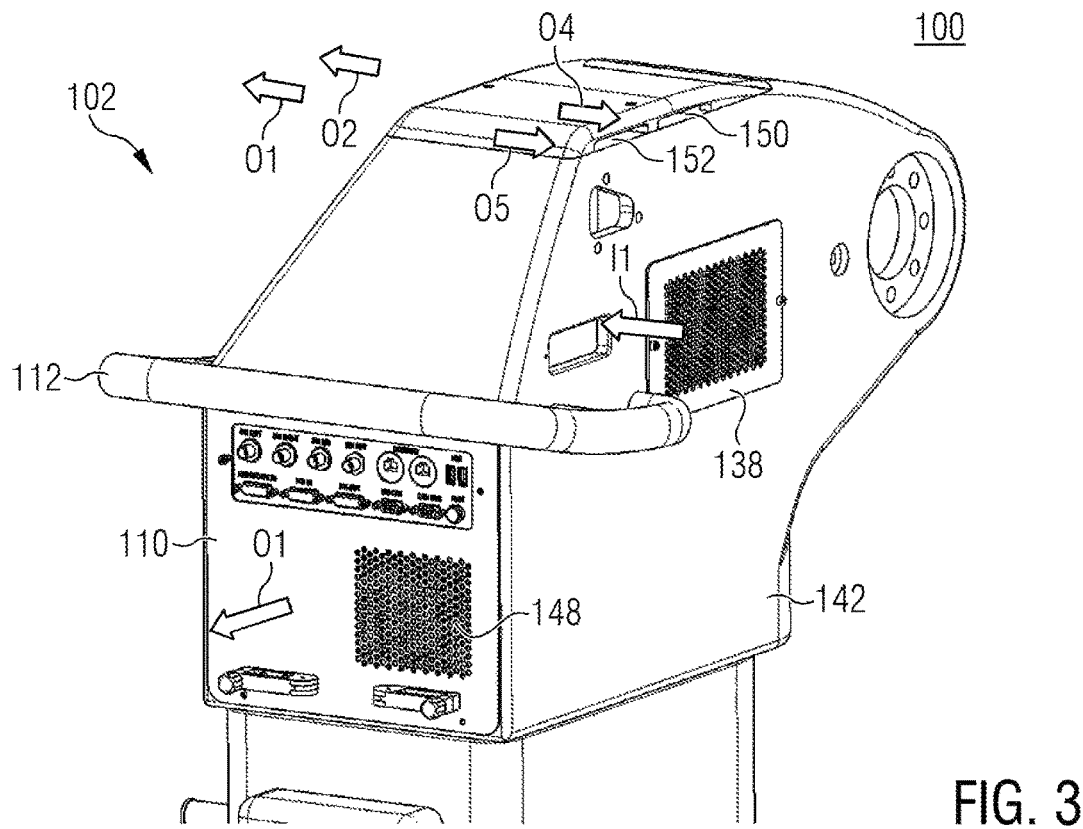
FIG. 3 is another perspective view of the microscope stand.

The housing 102 may comprise at least one air inlet and at least one air outlet which form part of the cooling system 126 likewise. For instance, the housing 102 comprises two air inlets 136, 138 which are located on front surface 140 and rear surface 142 of the housing 102, respectively, as shown in FIGS. 1 and 3. Further, the housing 102 comprises a plurality of air outlets 144 to 152. Among said plurality of air outlets, those referenced by 144, 146 are located on an upper part of the front surface 140 of the housing 102 as shown in FIGS. 1 and 2. Further, the air outlet 148 is located on a lower part of the side surface 108 of the housing 102 being formed by the front plate 110 of the module 104. The air outlets 150, 152 are located on an upper part of the rear surface 142 of the housing 102 as shown in FIG. 3.

Subsequently, operation of the cooling system 126 is explained in more detail.

As mentioned above, the air duct 128 forming part of the cooling system 126 is mounted to the inner wall 132 of the housing 102. The fan 130 included in the air duct 128 is located next to the air inlet 138 provided on the rear surface 142 of the housing 102. Thus, the fan 130 is arranged to draw air from outside through the air inlet 138 into the interior 106 of the housing 102 as illustrated in FIG. 3 by arrow I1. As further illustrated in FIG. 4 by arrows C1 and C2, the vertically elongated air duct 128 creates an air flow which is discharged from the discharge opening 134 towards the module 104 carrying the CPU 120 and the power supply 122. This air flow passes the module 104 and escapes from the housing 102 through the air outlet 148 provided on the front plate 110 as illustrated by arrow C3 in FIG. 4 and arrow O1 in FIG. 1. As a result, the module 104 is cooled by the air flow entering the housing 102 through the air inlet 138 and escaping therefrom through the air outlet 148.

Further, the cooling system 126 utilizes the fan 124 integrated with the CPU 120. In the first place, the fan 124 has the intrinsic function to cool the CPU 120 as such. In addition to this intrinsic cooling function, the fan 124 further serves to draw air from the outside through the air inlet 136 provided in the front surface 140 into the housing 102 as illustrated by arrow 12 in FIGS. 1 and 2. For this, the fan 124 is positioned to face the air inlet 136 from the interior of the housing 102.

For providing an upstream cooling airflow within the housing 102 as illustrated in FIG. 2 by arrows C3 and C4 described above, the cooling system 126 may comprise an air deflector structure commonly referred to as 154 in FIG. 2. The air deflector structure 154 may comprise e.g. a plurality of metal sheets configured to deflect and guide the air flow as desired. For instance, metal sheets provided close to the air inlet 136 may be used to guide the air from the air inlet 136 upwards to the air outlets 144, 146, 150, 152 so that the air flow escapes there through from the housing 102 as illustrated by arrows O2 to O5 in FIGS. 1 to 3. Further, in order to utilize natural convection for the heat transport within the housing 102, the air outlets 144, 146 150, 152 are arranged in vertical direction above the air inlet 136 in an operating position of the microscope stand 100.

According to the specific configuration disclosed herein, the cooling airflow passes the rear side of the display device 114 before leaving the housing 102 through the air outlets 144, 146 150, 152. In this way, the display device 114 is effectively cooled from inside of the housing 102.

In the present embodiment, the CPU 120 comprises in addition to the fan 124 an integrated liquid cooler 160. The liquid cooler 160 comprises a plurality of cooling fins forming a heat sink which is coupled to the CPU 120. The fan 124 integrated with the CPU 120 is configured to guide the air through the air inlet 136 such that the air passes the liquid cooler 160.

It is to be noted that the air deflector structure 154 may also configured the guide the air flow which is created by the air duct 128. In the specific configuration shown in FIGS. 2 and 4, a metal sheet 156 is mounted between the liquid cooler 160 and the air outlet 148, this metal sheet 156 comprising an aperture 158 which defines a path through which the airflow passes from the liquid cooler 160 towards the air outlet 148.

As mentioned above, the housing 102 and the module 104 are adapted to each other in order to mount the module 104 at a predetermined installation site within the housing 102. For this, the housing 102 comprises a first locating device commonly referred to as 162 in FIG. 5, and the module 104 comprises a second locating device commonly referred to as 164 in FIG. 6. The locating devices 162, 164 are configured to interact with each other so that the module 104 can be guided to the installation site within the housing and fixed thereto during assembly.

Figure 7:
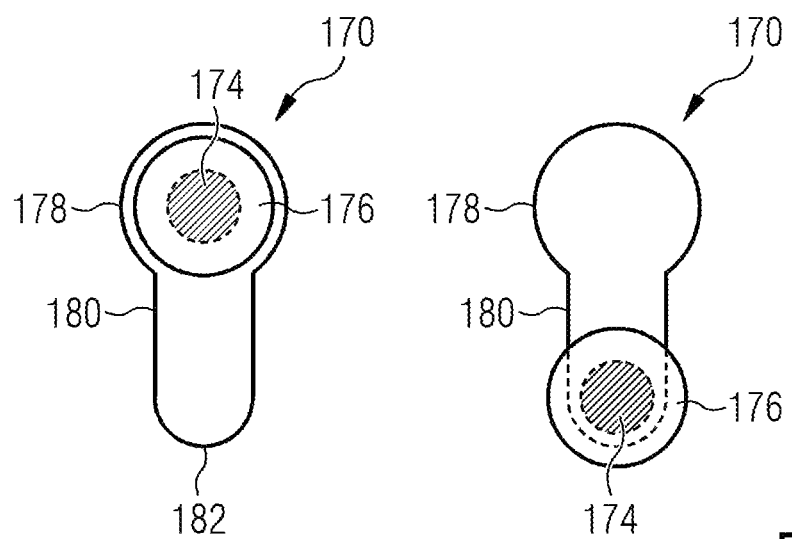
FIG. 7 is a schematic plan view showing a linear guiding system comprising a slot and an anchor for mounting the module within the housing.
Figure 8:
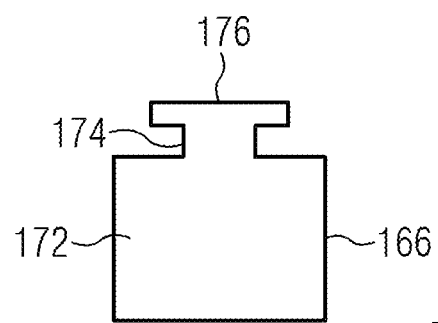
FIG. 8 is a side view showing the anchor of the linear guiding system.

The locating devices 162, 164 may be configured to form a linear guiding system as illustrated in FIGS. 5 and 6. In this specific embodiment, the first locating device 162 provided in the housing 102 comprises a plurality of anchors 166 mounted on a base plate 168 of the housing 102, and the second locating device 164 formed on the module 104 comprises a corresponding number of slots 170. As shown in FIGS. 7 and 8, each anchor 166 is formed by a base element 172, a narrow post 174 extending upwards from the base element 172, and a broad head 176 extending upwards from the post 174. Further, each slot 170 has an elongated shape and comprises a widened insertion portion 178 and a narrow guide portion 180 extending from the insertion portion 178.

FIG. 7 shows the dimensional relationship between the anchor 166 and the slot 170 associated therewith. Thus, the broad head 176 of the anchor 166 is smaller than the insertion portion 178 of the slot 170. Accordingly, the broad head 176 of the anchor 166 fits loosely into the insertion portion 178 of the slot 170 when the module 104 is put onto the base plate 168 of the housing 102 from above during assembly (see left side of FIG. 7 and FIG. 9). On the other hand, the head 176 of the anchor 166 is larger than the guide portion 180 of the slot 170 whereas the post 174 of the anchor 166 is smaller than the guide portion 180 of the slot 170. Accordingly, the post 174 of the anchor 166 fits loosely into the guide portion 180 of the slot 170 when the module 104 is shifted in a direction along the guide portion 180 into the housing 102 during assembly (see right side of FIG. 7 and FIG. 10). Thus, the module 104 can be shifted within the housing 102 until the post 174 abuts against an end 182 of the guide portion 180 which faces away from the insertion portion 178 and defines a stop position for the post 174. When the post 174 of the anchor 166 abuts the end 182 of the guide portion 180, the module 104 has reached the predetermined installation site within the housing 102.

Figure 9:
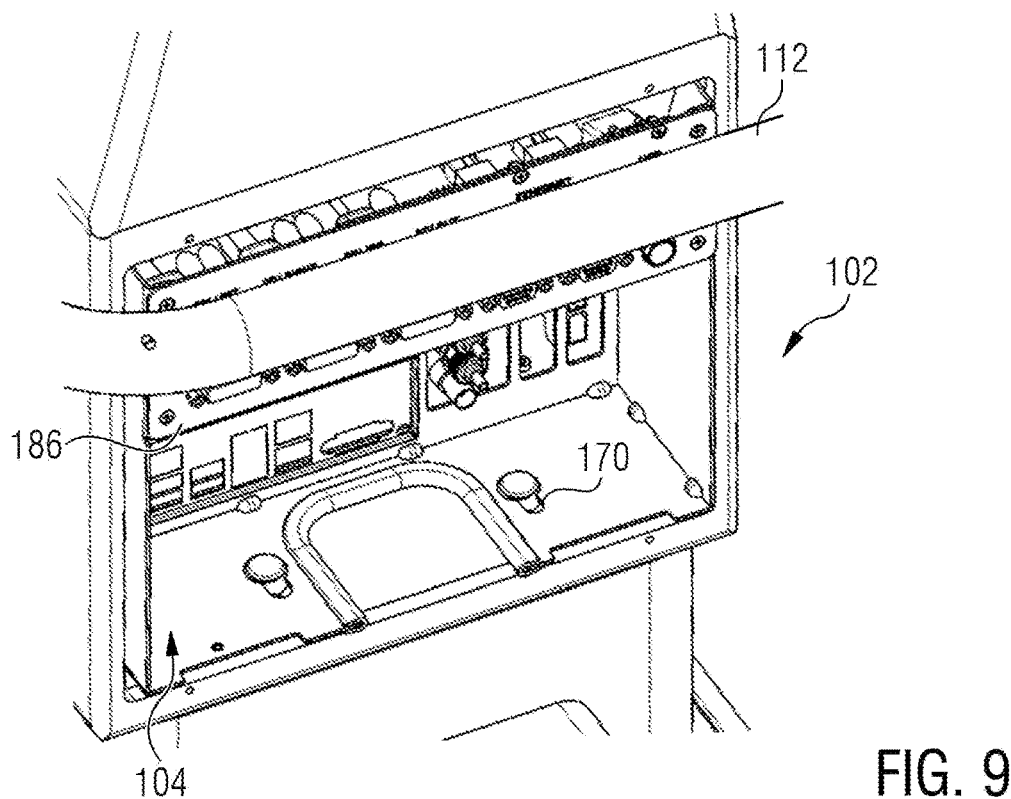
FIG. 9 is a perspective view of the microscope stand illustrating a state in which the module has been inserted into the housing but not yet fixed therein.
Figure 10:
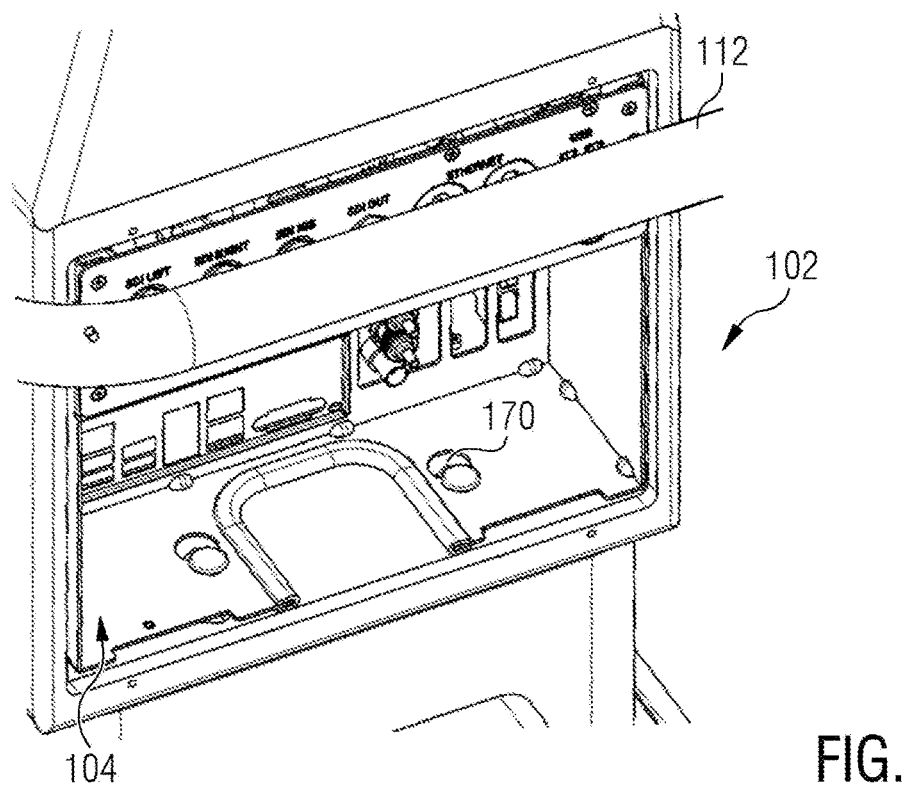
FIG. 10 is a perspective of the microscope stand in a state in which the module has been fixed within the housing.

As mentioned above, in a state in which the module 104 is mounted within the housing 102 at the predetermined installation site, the front plate 110 of the module 104 forms the side surface 108 of the housing 102. The front plate 110 of the module 104 may be formed by a frame element 184 comprising the air outlet 148 and a front panel 186 which is fitted into an opening provided in the frame element 184. It is to be noted that FIGS. 9 and 10 show the module 104 with the frame element 184 of the front plate 110 being removed.

The front panel 186 may comprise a plurality of user-accessible external connectors 188 which can be coupled to the control device 118. Thus, the front plate 110 enables a user to provide the required electrical connections in a convenient manner.

As used herein the term "and/or" includes any and all combinations of one or more of the associated listed items and may be abbreviated as "/".

Although some aspects have been described in the context of an apparatus, it is clear that these aspects also represent a description of the corresponding method, where a block or device corresponds to a method step or a feature of a method step. Analogously, aspects described in the context of a method step also represent a description of a corresponding block or item or feature of a corresponding apparatus.

LIST OF REFERENCE SIGNS 100 microscope stand
102 housing
104 module
106 interior
108 side surface
110 front plate
112 hand grip
114 display device
116 screen
118 control device
120 CPU
122 power supply
124 fan
126 cooling system
128 air duct 130 fan
132 inner wall
134 discharge opening
136 air inlet
138 air inlet
140 front surface
142 rear surface
144 air outlet
146 air outlet
148 air outlet
150 air outlet
152 air outlet
154 air deflector structure
156 metal sheet
158 aperture
160 liquid cooler
162 locating device
164 locating device
166 anchor
168 base plate
170 slot
172 base element
174 post
176 head
178 insertion portion
180 guide portion
182 end
184 frame element
186 front panel

What is claimed is:

1. A module for a microscope stand, the microscope stand having a housing, the module comprising:
   a control device having at least one computer hardware component configured to control the microscope stand; and
   a locating device configured to interact with another locating device formed in the housing of the microscope stand for mounting the module at a predetermined installation site within the housing in a guided manner such that the module remains fixed at the predetermined installation site when the microscope stand is in use.

2. The module according to claim 1, further comprising a front plate, wherein the front plate forms a side surface of the housing when the module is located at the installation site.

3. The module according to claim 2, wherein the front plate comprises at least one air outlet.

4. The module according to claim 2, wherein the front plate comprises a front panel having user-accessible external connectors configured to be coupled to the control device.

5. The module according to claim 1, wherein the at least one computer hardware component is selected from a group including a central processing unit, a power supply, a graphic card, and a display device.

6. The module according to claim 1, further comprising a liquid cooler integrated with the computer hardware component.

7. A housing for a microscope stand, the housing comprising:
   at least one air inlet,
   at least one air outlet,
   a fan positioned at the air inlet and configured to draw air from outside the housing through the air inlet into an interior of the housing,
   a predetermined installation site inside the housing for receiving a control device having at least one computer hardware component, and
   an air duct configured to guide the air drawn into the interior of the housing thereby creating a cooling air flow between the at least one air inlet and the at least one air outlet passing the installation site;
   wherein the installation site is configured to receive a module including the control device; and
   wherein the housing comprises a locating device configured to interact with another locating device formed on the module for mounting the module at said predetermined installation site within the housing in a guided manner such that the module remains fixed at the predetermined installation site when the microscope stand is in use.

8. The housing according to claim 7, further comprising a display device, at least a part thereof being accommodated within the housing, wherein the display device is arranged such that the cooling air flow passes said part of the display device.

9. A microscope stand comprising:
   a housing including a first air inlet, at least one air outlet, a fan positioned at the first air inlet and configured to draw air from outside the housing through the first air inlet into an interior of the housing, a predetermined installation site in the interior of the housing, an air duct configured to guide the air drawn into the interior of the housing thereby creating a cooling air flow between the first air inlet and the at least one air outlet passing the installation site, and a locating device formed in the housing;
   a module including a control device having at least one computer hardware component configured to control the microscope stand and a locating device configured to interact with the locating device formed in the housing of the microscope stand for mounting the module at the predetermined installation site in the interior of the housing in a guided manner; and
   the module further including a front plate comprising at least one air outlet, wherein the front plate forms a side surface of the housing when the module is located at the installation site.

10. The microscope stand according claim 9, wherein the at least one computer hardware component comprises an integrated fan configured to cool the at least one computer hardware component, the integrated fan being positioned to draw air from outside the housing through a second air inlet of the housing into the interior of the housing.

11. The microscope stand according to claim 9, wherein the interacting locating devices of the module and the housing form a linear guiding system.

12. The microscope stand according to claim 11, wherein the linear guiding system comprises at least one elongated slot and at least one anchor which is configured to be guided along the slot to a stop position defining the predetermined installation site within the housing.

13. The microscope stand according to claim 9, wherein at least one of the housing and the module comprises an air deflector structure configured to guide the cooling air flow to the at least one air outlet.

* * * * *